United States Patent
Ueda et al.

(10) Patent No.: US 8,165,005 B2
(45) Date of Patent: Apr. 24, 2012

(54) OPTICAL RECORDING METHOD AND OPTICAL RECORDING APPARATUS

(75) Inventors: Daisuke Ueda, Kanagawa (JP); Takashi Iwamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 12/410,769

(22) Filed: Mar. 25, 2009

(65) Prior Publication Data

US 2009/0245077 A1 Oct. 1, 2009

(30) Foreign Application Priority Data

Mar. 26, 2008 (JP) ................. P2008-081323

(51) Int. Cl.
*G11B 7/00* (2006.01)

(52) U.S. Cl. ........................ 369/116; 369/103

(58) Field of Classification Search .................. None
See application file for complete search history.

(56) References Cited

U.S. PATENT DOCUMENTS

| | | | | |
|---|---|---|---|---|
| 6,430,204 B1 * | 8/2002 | Tanaka | ........ | 372/46.01 |
| 7,349,315 B2 * | 3/2008 | Narumi et al. | ........ | 369/59.12 |
| 2004/0066728 A1 * | 4/2004 | Gu et al. | ........ | 369/103 |

FOREIGN PATENT DOCUMENTS

| | | |
|---|---|---|
| JP | 02-282932 | 11/1990 |
| JP | 06-162506 | 6/1994 |
| JP | 2004-139638 | 5/2004 |
| JP | 2005-37651 | 2/2005 |
| JP | 2006-196125 | 7/2006 |

OTHER PUBLICATIONS

M. Watanabe et al, "Three-Dimensional Optical Data Storage in Vitreous Silica", Japanese Journal of Applied Physics, vol. 37, Part 2, No. 12B, pp. L1527-L1530 (1998).
Laser handbook, Second edition, the Laser Society of Japan, p. 912).
Dynamics of photoenergy relaxation in copper phthalocyanine solids.

* cited by examiner

*Primary Examiner* — Thang Tran
*Assistant Examiner* — Parul Gupta
(74) *Attorney, Agent, or Firm* — Finnegan, Henderson, Farabow, Garrett & Dunner, LLP

(57) ABSTRACT

Disclosed is an optical recording method. The optical recording method includes irradiating an area where a recording mark is formed in a medium with a pulse train of laser light, and irradiating the area where the recording mark is formed with continuous-wave laser light that is continuously output.

18 Claims, 10 Drawing Sheets

OPTICAL RECORDING METHOD AND OPTICAL RECORDING APPARATUS

CROSS REFERENCES TO RELATED APPLICATIONS

The present invention contains subject matter related to Japanese Patent Application JP 2008-081323 filed in the Japanese Patent Office on Mar. 26, 2008, the entire contents of which being incorporated herein by reference.

BACKGROUND OF THE INVENTION

1. Field of the Invention

The present invention relates to an optical recording method and an optical recording apparatus for recording information by irradiating a medium with light.

2. Description of the Related Art

There have been proposed various bit-by-bit volumetric recordings with respect to a recording medium. For example, a 3D pit recording with respect to a transparent medium has been proposed (see, "Three-Dimensional Optical Data Storage in Vitreous Silica", written by Hirao et al., Jpn. J. Appl. Phys. Vol. 37 (1998) pp. L1527-L1530 (hereinafter, referred to as Non-patent Document 1)). Further, mark formation on an organic medium with foam due to a nonlinear optical effect has been proposed (see, Japanese Patent Application Laid-open No. 2005-37658 (paragraph [0166]) (hereinafter, referred to as Patent Document 1)). Generally, in those volumetric recording methods, an ultrashort pulse is mainly used for recording, and a reaction process for forming a recording mark is considered to be completely the same as a reaction process of ablation. A hole formation by a laser ablation is considered to be caused by a combination of a photochemical reaction and a photothermal reaction (see, Laser handbook, Second edition, the Laser Society of Japan (hereinafter, referred to as Non-patent Document 2), p. 912).

For example, in a case where an ablation is caused with respect to a material using a CW (Continuous Wave) laser, high average light energy of several watts is required for causing a thermal decomposition that is a principle of the ablation, which causes a cost problem of a light source.

In contrast, in an ablation using an ultrashort pulse laser of a femtosecond to picosecond order, a photochemical reaction due to a high peak power and a short-time exposure is dominant, which allows the ablation with a lower average light energy.

A material irradiated with ultrashort-pulse laser light is photoexcited and causes dissociation, ionization, and the like due to the photochemical reaction. Generally, when the photochemical reaction occurs by the irradiation of the material with the ultrashort-pulse laser light, an absorption spectrum of the material is transiently changed, which causes light absorption to easily occur.

For example, when a metallic material is irradiated with the ultrashort pulse laser, an electron-system excitation due to a multiphoton absorption occurs, which generates a conduction electron, an ion, and a plasma (see, Non-patent Document 2, p. 926).

Also in a case of an organic molecule, when a savinyl-blue organic material is irradiated with a high-intensity ultrashort pulse, a change in electron state due to a light absorption and exciton-exciton relaxation occur, with the result that transient absorption change/increase is caused (see, "Dynamics study on femtosecond laser ablation of copper phthalocyanine solid", doctor thesis, 2000, written by Yoichiro Hosokawa, Graduate School of Engineering, Osaka University (hereinafter, referred to as Non-patent Document 3), Chapter 3). An absorption time period in this case is several tens of picoseconds or more.

SUMMARY OF THE INVENTION

However, the photochemical reaction ends before a thermal reaction of a nanosecond to several-ten picoseconds order advances (before a recording mark is formed). For example, as disclosed in Non-patent Document 2, a life time of an excitation state is several picoseconds or more, and therefore the ultrashort pulse laser in related art cannot cause any photoexcitation until the next irradiation (see, Non-patent Document 2, p. 926). Further, as disclosed in Non-patent Document 3, by irradiating an organic material with a high-intensity ultrashort-pulse laser light, a transient absorption can be caused. However, general high-intensity ultrashort pulse laser has a pulse width of a femtosecond to several picoseconds order and an interval between pulses in a pulse train is generally several 100 nanoseconds. For this reason, this transient absorption cannot be used. Therefore, with a beam power having only a value close to a threshold value of a light power required for causing a photoreaction with respect to a material, only an extremely small area reacts.

Therefore, it is necessary to control a shape of a recording mark by merely using a light energy that is much higher than the threshold value and diffusing heat generated after irradiation with the ultrashort pulse. For example, as disclosed in Patent Document 1, it is necessary to use a much higher energy per pulse for performing deep ablation with a femtosecond laser.

As described above, in a method of exposing light with the ultrashort-pulse light source in which a pulse width, a wavelength, and a repetition frequency are fixed, there is no alternative but to change a peak intensity per pulse or change an irradiation time period for controlling the shape of the recording mark.

In view of the above-mentioned circumstances, it is desirable to provide an optical recording method and an optical recording apparatus capable of forming a recording mark in a medium with a low light power.

According to an embodiment of the present invention, there is provided an optical recording method. The optical recording method includes irradiating an area where a recording mark is formed in a medium with a pulse train of laser light, and irradiating the area where the recording mark is formed with continuous-wave laser light that is continuously output.

In this embodiment, an extremely small area on the medium can be brought into an excitation state (or transient state) by the optical reaction of the medium with the pulse of the laser light, which can cause the light absorption to easily occur. In the excitation state (transient state), the medium is irradiated with the continuous-wave laser light to increase light absorption of the continuous-wave laser light and cause a thermal reaction, with the result that the recording mark is formed in the medium. That is, the extremely small area in the medium is brought into the excitation state (or transient state) with the pulse of the laser light of the low power without making the power of the laser light larger than a threshold value at which the extremely small area in the medium can be brought into the excitation state (transient state), and the area is irradiated with the continuous-wave laser light before the excitation state (or transient state) is ended, with the result that the thermal reaction can be caused in the medium and the recording mark can be formed in the medium with the low light power.

The laser light is ultrashort-pulse laser light, and the irradiation with the ultrashort-pulse laser light and the irradiation with the continuous-wave laser light are performed in a temporally overlapping manner. The ultrashort pulse means that the pulse has a pulse width of a femtosecond to 100 picoseconds order, for example.

With this structure, the ultrashort-pulse laser light can bring the extremely small area in the medium into the excitation state (or transient state), and can cause the light absorption to easily occur. Accordingly, in the excitation state (or transient state), the medium is irradiated with the continuous-wave laser light, the thermal reaction is caused, and thus the recording mark can be formed.

In this case, the irradiation with the continuous-wave laser light is performed after the irradiation with the ultrashort-pulse laser light is started.

With this structure, the extremely small area in the medium is positively brought into the excitation state (or transient state) by the photoreaction of the medium with the ultrashort-pulse laser light, and then the medium is irradiated with the continuous-wave laser light, making it possible to positively form the recording mark.

In this case, the irradiation with the continuous-wave laser light is started at the same time when the irradiation with the ultrashort-pulse laser light is started.

With this structure, it is possible to easily synchronize the irradiation timings of the ultrashort-pulse laser light and the continuous-wave laser light and irradiate the medium with the ultrashort-pulse laser light and the continuous-wave laser light.

In this case, the irradiation with the continuous-wave laser light is started before the irradiation with the ultrashort-pulse laser light is started.

With this structure, the medium is irradiated with the continuous-wave laser light in advance, and then the recording mark can be formed by the irradiation with the ultrashort-pulse laser light and the continuous-wave laser light.

Here, an intensity of the continuous-wave laser light may be modulated before the irradiation with the continuous-wave laser light is performed. With this structure, it is possible to control the amount of energy of the continuous-wave laser light to be supplied to the medium, effectively cause the light absorption in the extremely small area in the medium in the excitation state (or transient state), and cause the thermal reaction.

Here, a frequency of the continuous-wave laser light may be modulated before the irradiation with the continuous-wave laser light is performed. With this structure, it is possible to control the amount of energy of the continuous laser light to be supplied to the medium and control the temperature of the medium so as not to overheat the medium, for example.

The ultrashort-pulse laser light and the continuous-wave laser light are caused to enter the medium in the same direction on the same axis. With this structure, optical paths of the ultrashort-pulse laser light and the continuous-wave laser light overlap, which allows reduction in size and cost of the optical system.

The ultrashort-pulse laser light and the continuous-wave laser light are caused to enter the medium in opposite directions on the same axis. With this structure, the ultrashort-pulse laser light enters the medium from one side of the medium and the continuous-wave laser light enters the medium from the other side thereof, with the result that the recording medium can be formed.

The ultrashort-pulse laser light has a pulse width of a femtosecond or more and 100 picoseconds or less. With this structure, the extremely small area in the medium can be brought into the excitation state (or transient state). Here, the ultrashort-pulse laser light may have the pulse width of a femtosecond or more and several hundreds of picoseconds (e.g., 500 picoseconds) or less.

The ultrashort-pulse laser light has a pulse power of 1 kW or less. With this structure, there is no need to irradiate the medium with the ultrashort-pulse laser light having the pulse power of 100 kW unlike the case in related art. As a result, the recording mark can be formed using a low-cost optical system.

According to another embodiment of the present invention, there is provided an optical recording apparatus. The optical recording apparatus includes a laser light source to irradiate an area where a recording mark is formed in a medium with a pulse train of laser light, and a continuous-wave laser light source to irradiate the area where the recording mark is formed with continuous-wave laser light that is continuously output.

In this embodiment, an extremely small area on the medium can be brought into an excitation state (or transient state) by the optical reaction with the pulse of the laser light, which can cause the light absorption to easily occur. In the excitation state (transient state), the medium is irradiated with the continuous-wave laser light to increase light absorption of the continuous-wave laser light and cause a thermal reaction, with the result that the recording mark is formed in the medium. That is, the extremely small area in the medium is brought into the excitation state (or transient state) with the pulse of the laser light of the low light power without making the power of the laser light larger than a threshold value at which the extremely small area in the medium can be brought into the excitation state (transient state), and the area is irradiated with the continuous-wave laser light before the excitation state (or transient state) is ended, with the result that the thermal reaction can be caused in the medium and the recording mark can be formed in the medium with the low light power.

In this case, the laser light source is a mode-locked laser light source to emit ultrashort-pulse laser light, and the optical recording apparatus further includes a controller to control timings of irradiation with the ultrashort-pulse laser light and irradiation with the continuous-wave laser light so that irradiation time periods with the ultrashort-pulse laser light and the continuous-wave laser light overlap.

With this structure, the ultrashort-pulse laser light can bring the extremely small area in the medium into the excitation state (or transient state) and can cause the light absorption to easily occur. Accordingly, in the excitation state (or transient state), the medium is irradiated with the continuous-wave laser light, the thermal reaction is caused in an overlapping manner of the ultrashort-pulse laser light and the continuous-wave laser light, and thus the recording mark can be formed.

In this case, the controller controls the timings of the irradiation with the ultrashort-pulse laser light from the mode-locked laser light source and the irradiation with the continuous-wave laser light so that the medium is irradiated with the continuous-wave laser light after the irradiation with the ultrashort-pulse laser light is started.

With this structure, the extremely small area in the medium is positively brought into the excitation state (or transient state) by the photoreaction of the medium with the ultrashort-pulse laser light, and then the medium is irradiated with the continuous-wave laser light, making it possible to positively form the recording mark.

In this case, the controller controls the timings of the irradiation with the ultrashort-pulse laser light from the mode-locked laser light source and the irradiation with the continuous-wave laser light so that the medium is irradiated with the continuous-wave laser light at the same time when the irradiation with the ultrashort-pulse laser light is started.

With this structure, it is possible to easily synchronize the irradiation timings of the ultrashort-pulse laser light and the continuous-wave laser light and irradiate the medium with the ultrashort-pulse laser light and the continuous-wave laser light.

In this case, the controller controls the timings of the irradiation with the ultrashort-pulse laser light from the mode-locked laser light source and the irradiation with the continuous-wave laser light so that the medium is irradiated with the continuous-wave laser light before the irradiation with the ultrashort-pulse laser light is started.

With this structure, the medium is irradiated with the continuous-wave laser light in advance, and then the recording mark can be formed by the irradiation with the ultrashort-pulse laser light and the continuous-wave laser light.

As described above, according to the embodiments of the present invention, the recording mark can be formed in the medium with a low light power.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

Figure 1:
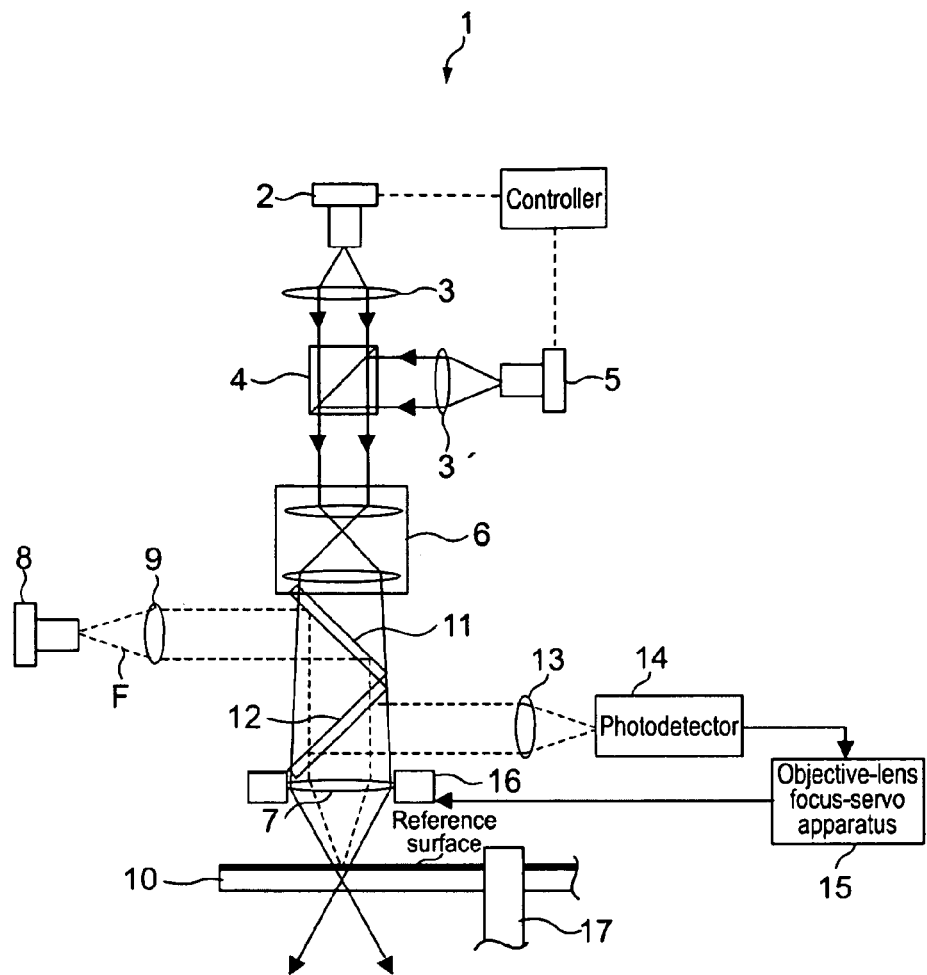
FIG. 1 is a block diagram showing an optical recording apparatus according to an embodiment of the present invention.

FIG. 1 is a block diagram showing an optical recording apparatus according to an embodiment of the present invention.

As shown in FIG. 1, an optical recording apparatus 1 includes a mode-locked laser 2, lenses 3 and 3', a polarization beam splitter 4, a CW (Continuous Wave) laser 5, a relay lens 6, an objective lens 7, a servo-only laser 8, a lens 9, a beam splitter 11, a beam splitter 12, a focusing lens 13, a photodetector for focus servo 14, an objective-lens focus-servo apparatus 15, an objective-lens actuator 16, and a spindle 17.

The mode-locked laser 2 generates ultrashort-pulse laser light at predetermined time intervals. The ultrashort pulse means that the pulse has a pulse width of a femtosecond to 100 picoseconds order, for example. The ultrashort-pulse laser light has a frequency of 500 MHz and a wavelength of 405 nm and is used for recording. As a laser medium, for example, a Ti:S (titanium-doped sapphire) crystal is used. The ultrashort-pulse laser light emitted from the mode-locked laser 2 is in a linearly-polarized state.

The lens 3 causes the ultrashort-pulse laser light emitted from the mode locked laser 2 to be parallel light and causes the parallel light to enter the polarization beam splitter 4.

The polarization beam splitter 4 causes the linearly-polarized ultrashort-pulse laser light from the lens 3 to pass therethrough, causes the light to enter the relay lens 6, and reflects, toward the relay lens 6, CW laser light passing through a lens 3' in a polarization state perpendicular to that of the ultrashort-pulse laser light.

The CW laser 5 emits the CW laser light toward the lens 3'. The CW laser light has, for example, an average power of 100 mW and an irradiation time period of approximately 30 nanoseconds (exposure time period that can be ensured for forming the shortest recording mark). The CW laser light is in the polarization state perpendicular to that of the ultrashort-pulse laser light emitted from the mode-locked laser 2.

A controller S controls a timing of emitting the ultrashort-pulse laser light from the mode-locked laser 2 and a timing of emitting the CW laser light from the CW laser 5 as will be described later.

The relay lens 6 causes the laser light from the polarization beam splitter 4 to enter the objective lens 7 via the beam splitters 11 and 12. The relay lens 6 is also used for adjusting a focal position of the laser light in a thickness direction of a recording medium 10.

The objective lens 7 focuses the ultrashort-pulse laser light and the CW laser light that have entered, on the same position on the recording medium 10. The objective lens 7 has an NA of 0.85.

The servo-only laser 8 emits toward the lens 9 focus servo light F (indicated by the dotted line in FIG. 8) for focus servo whose wavelength is, e.g., 630 nm.

The lens 9 causes the focus servo light F to enter the beam splitter 11.

The beam splitter 11 reflects the focus servo light F toward the beam splitter 12.

The beam splitter 12 causes the focus servo light F from the beam splitter 11 to pass therethrough. The focus servo light F that has passed through the beam splitter 12 is focused by the objective lens 7 and reflected by a reference surface of the recording medium 10. The reference surface of the recording medium 10 is a wavelength-selective film that reflects the focus servo light F and causes the CW laser light and the ultrashort-pulse laser light for recording to pass therethrough. The focus servo light F reflected by the reference surface passes through the objective lens 7 and then enters the beam splitter 12. The beam splitter 12 reflects the incident focus servo light F toward the focusing lens 13.

The focusing lens 13 focuses the focus servo light F reflected by the beam splitter 12 on the photodetector 14.

Based on the focus servo light F from the focusing lens 13, the photodetector 14 outputs a signal to the objective-lens focus-servo apparatus 15 by an astigmatic method, for example.

Based on the signal from the photodetector 14, the objective-lens focus-servo apparatus 15 outputs a control signal for controlling the objective-lens actuator 16.

Based on the control signal from the objective-lens focus-servo apparatus 15, the objective-lens actuator 16 moves the objective lens 7 for focus control.

Figure 2:
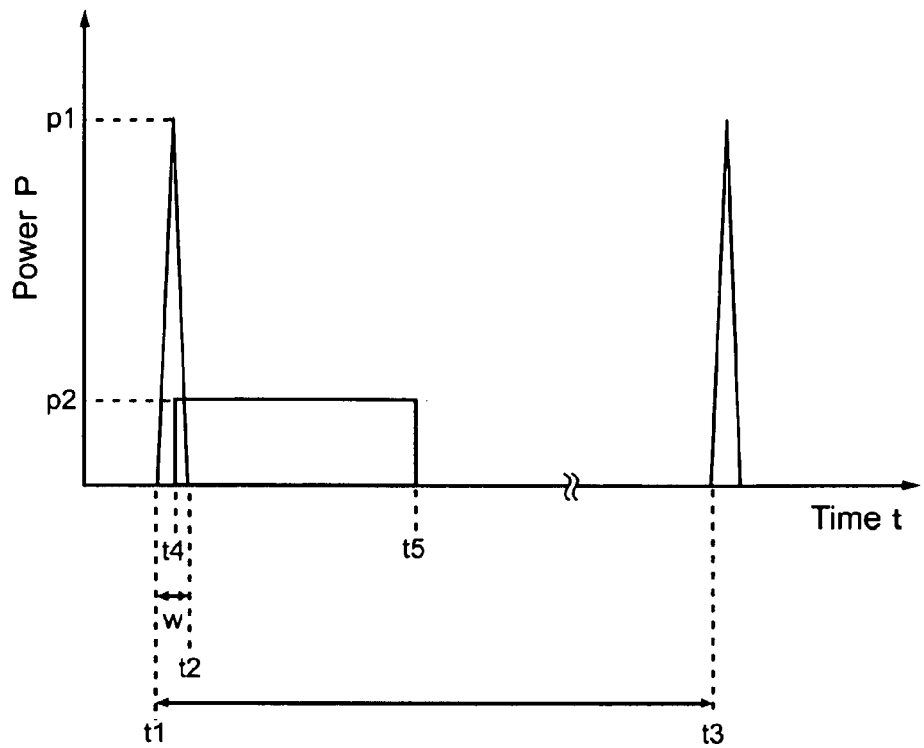
FIG. 2 is a diagram showing a relationship between powers of ultrashort-pulse laser light and CW laser light and time.

FIG. 2 is a diagram showing a relationship between powers of the ultrashort-pulse laser light and the CW laser light and time.

As shown in FIG. 2, the ultrashort-pulse laser light which is emitted from the mode-locked laser 2 and with which the recording medium 10 is irradiated is laser light for recording that has a pulse width w (t2–t1) of a femtosecond to hundred picoseconds order, a frequency of 500 MHz (irradiation period of the ultrashort pulse (t3–t1)), power P of p1 (e.g., 1 kW or less), and a wavelength of 405 nm.

Here, t1 indicates an irradiation start time with a first ultrashort pulse, t2 indicates an irradiation end time with the first ultrashort pulse, and t3 indicates an irradiation start time with a second ultrashort pulse emitted from the mode-locked laser 2 after the first ultrashort pulse is emitted.

The CW laser light with which the recording medium 10 is irradiated has the power P of p2 (100 mW <p1), an irradiation start time t4 (t1<t4<t2), and an irradiation time period (t5–t4) of 30 (nsec), for example. The times t1 to t5 are controlled by the controller S, for example.

As a result, an irradiation energy of the ultrashort-pulse laser light is 1 nJ and an irradiation energy of the CW laser light is 3 nJ, and thus the energy of 4 nJ in total can be used.

Next, a method of optically recording information on the recording medium 10 with the optical recording apparatus 1 shown in FIG. 1 will be described.

Figure 3:
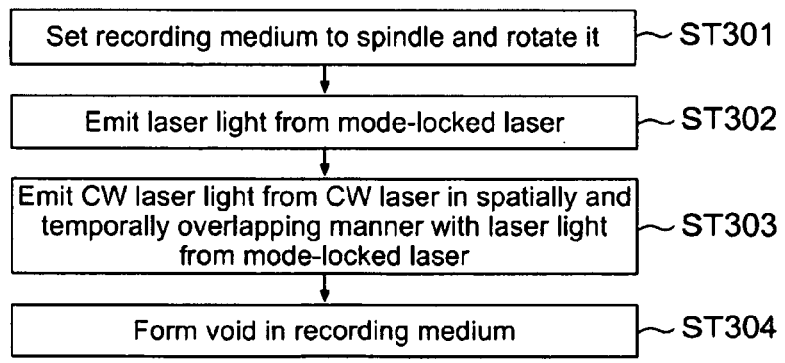
FIG. 3 is a flowchart showing an optical recording method with an optical recording apparatus shown in FIG. 1.
Figure 4A:
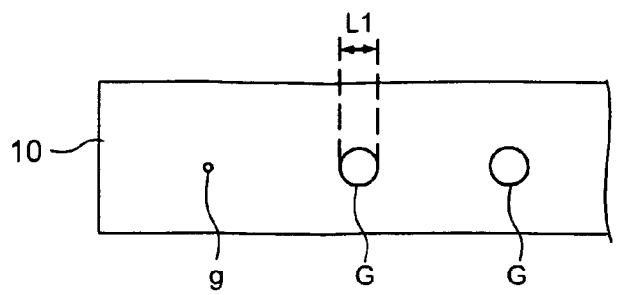
FIG. 4A is a diagram showing a state in which irradiation is performed with the ultrashort-pulse laser light.
Figure 4B:
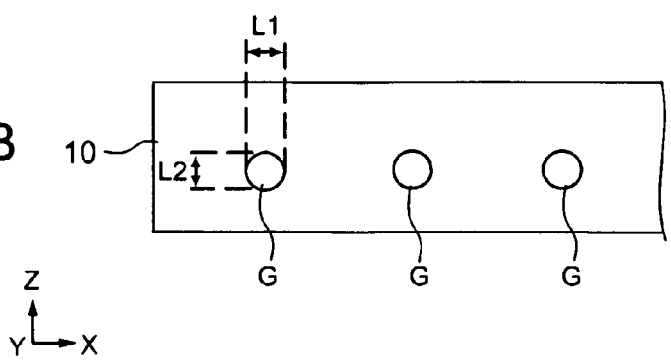
FIG. 4B is a diagram showing a state in which a recording mark is formed with the CW laser light.

FIG. 3 is a flowchart showing an optical recording method using the optical recording apparatus 1 shown in FIG. 1. FIG. 4A is a diagram showing a state in which irradiation is performed with the ultrashort-pulse laser light, and FIG. 4B is a diagram showing a state in which a recording mark is formed with the CW laser.

As shown in FIG. 1, the recording medium 10 is set to the spindle 17, and the recording medium 10 is rotated with a drive mechanism (not shown) (ST301). For example, a linear velocity of 5 m/s is set.

The mode-locked laser 2 emits the ultrashort-pulse laser light having a predetermined pulse width w (see, FIG. 2) at, for example, predetermined time intervals (t3–t1) (ST302).

With this structure, as shown in FIG. 2, for example, the irradiation with the first ultrashort pulse is started at the time t1 and is ended at the time t2. As a result, as shown in FIG. 4A, the recording medium 10 is photoexcited, and dissociation, ionization, and the like are caused due to a photochemical reaction. That is, the photochemical reaction causes an absorption spectrum to transiently change and brings an extremely small area g of the recording medium 10 into a state in which a light absorption is likely to occur (excitation state, transient state).

More specifically, for example, in a case where the recording medium 10 is made of a multiphoton absorption material, an electron-system excitation due to a multiphoton absorption occurs, which causes an excitation state in which a conduction electron, an ion, and a plasma are generated. Their life times are about several picoseconds.

Further, for example, in a case where the recording medium 10 is made of an organic material, a change in electron state due to the light absorption and an excitation-excitation relaxation are caused, and a state in which the absorption spectrum is transiently changed and increased (transient state) is caused. The absorption time period is several tens of picoseconds (or more).

Next, the CW laser 5 starts irradiation with the CW laser light at the time t4 (ST303). At this time, the focal point of the CW laser light and the focal point of the ultrashort-pulse laser light are matched. Further, the irradiation time period (t5–t4) of the CW laser light and the irradiation time period (t2–t1) of the ultrashort-pulse laser light overlap during a time period from the time t4 to the time t2 (see, FIG. 2).

As a result, by irradiating the area where the recording mark is formed with the CW laser light when the recording medium 10 is in the excitation state (or transient state) due to the ultrashort-pulse laser light, the light absorption of the CW laser light is increased and a thermal reaction is caused to control (urge) thermal ablation and form a recording mark G (e.g., void) in the recording medium 10 as shown in FIG. 4B (ST304).

As described above, according to this embodiment, the excitation state (or transient state) due to the photoreaction is caused in the extremely small area g in the recording medium 10 with the pulse of the ultrashort-pulse laser light having a low power of 1 kW, which allows the light absorption to easily occur. Further, the irradiation with the CW laser light in the excitation state (or transient state) (e.g., time t1 to time t2 of FIG. 2) causes the thermal reaction in the recording medium 10, with the result that the recording mark G (e.g., void) having a desired length L1 in an in-plane direction X of the recording surface on the recording medium 10 and a desired length L2 in a thickness direction Z thereof can be formed with the low light power as shown in FIG. 4B.

For example, in a case where a two-photon absorption material is used for the recording material 10, the irradiation of the material with the ultrashort-pulse laser light increases the energy in the area g in the vicinity of the focal point, so a two-photon absorption occurs and a void (hole) is formed in the area g. However, by the irradiation only, the two-photon absorption does not occur in the area apart from the focal point because of the low energy, and therefore the recording mark G (void) having the predetermined size is not formed.

However, according to this embodiment, as shown in FIG. 2, the irradiation with the CW laser light is started after the irradiation with the ultrashort-pulse laser light is started (time t1) (time t4>time t1), and therefore the ultrashort-pulse laser light and the CW laser light are temporally and spatially overlapped with each other. As a result, the excitation state is positively caused with the ultrashort-pulse laser light described above, and the CW laser light is supplied in the excitation state, making it possible to form the recording mark G by the thermochemical reaction.

A peak of the power P of the mode-locked laser 2 of the optical recording apparatus 1 is reduced to as small as 1 kW, with the result that the optical system can be structured at low cost.

The polarization beam splitter 4 causes the ultrashort-pulse laser light from the lens 3 that is linearly polarized to pass therethrough and then enter the relay lens 6, and reflects toward the relay lens 6 the CW laser light from the lens 3' in the polarization state perpendicular to the linear polarization of the laser light. With this structure, the ultrashort-pulse laser light and the CW laser light can be multiplexed without any energy loss. In this embodiment, even when the ultrashort-pulse laser light and the CW laser light have the same wavelength, the above structure can be applied, which is highly useful.

It should be noted that as long as the ultrashort-pulse laser light can cause the excitation state (transient state) and the CW laser light can cause the thermochemical reaction by the light absorption, the ultrashort-pulse laser light and the CW laser light may have different wavelengths.

In a case where the ultrashort-pulse laser light and the CW laser light have different wavelengths, instead of the polarization beam splitter 4 shown in FIG. 1, for example, a dichroic mirror having the same shape as the polarization beam splitter 4 may be used. The dichroic mirror reflects light (e.g., CW laser light) having a specific wavelength and causes light (e.g., ultrashort-pulse laser light) having a wavelength different from the specific wavelength to pass therethrough. With this structure, the ultrashort-pulse laser light and the CW laser light can also be multiplexed by the dichroic mirror.

Figure 5:
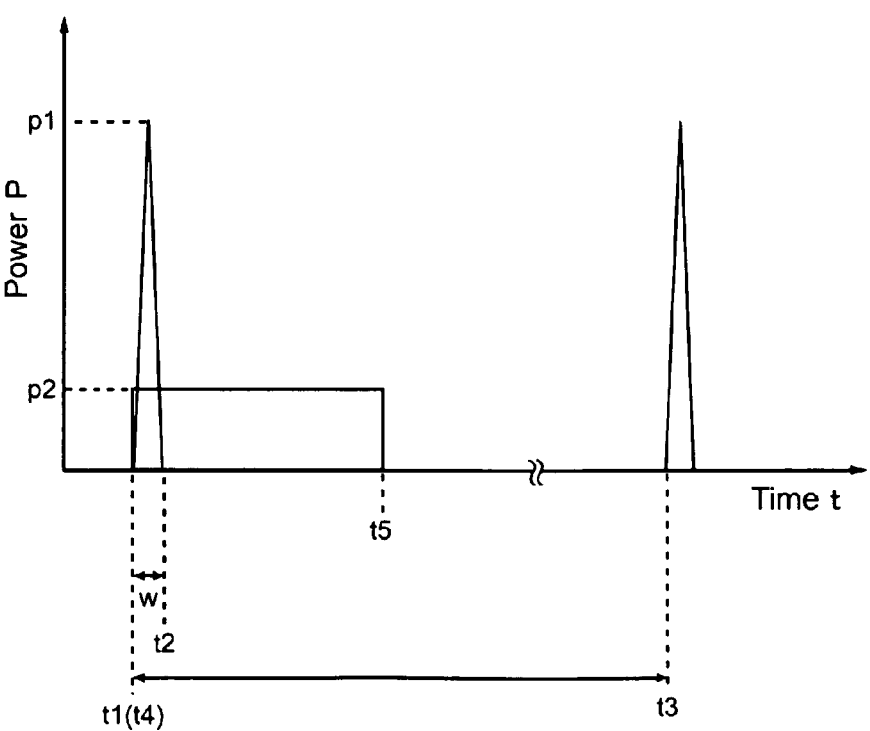
FIG. 5 is a diagram showing a relationship between powers of the ultrashort-pulse laser light and the CW laser light and time in a first modified example.

FIG. 5 is a diagram showing a relationship between powers of the ultrashort-pulse laser light and the CW laser light and time in a first modified example. It should be noted that in this modified example and subsequent ones, the same structures as those of the above embodiment are denoted by the same reference symbols, and their descriptions are omitted and different points will be mainly described.

The first modified example is different from the above embodiment in the irradiation timing at which the mode-locked laser 2 irradiates the recording medium 10 with the ultrashort-pulse laser light and the irradiation timing at which the CW laser 5 irradiates the recording medium 10 with the CW laser light.

As shown in FIG. 5, the CW laser 5 starts irradiation with first CW laser light at the same time (time t4) when the mode-locked laser 2 starts irradiation with first ultrashort-pulse laser light (time t1). It should be noted that n($\geqq$2)-th ultrashort-pulse laser light that follows the first ultrashort-pulse laser light and n($\geqq$2)-th CW laser light may have the same relationship, for example.

With this structure, the irradiation timings of the first ultrashort-pulse laser light and the first CW laser light can be easily synchronized by the controller S, for example, and the recording medium 10 can be irradiated with the first ultrashort-pulse laser light and the first CW laser light in a temporally overlapping manner.

Figure 6:
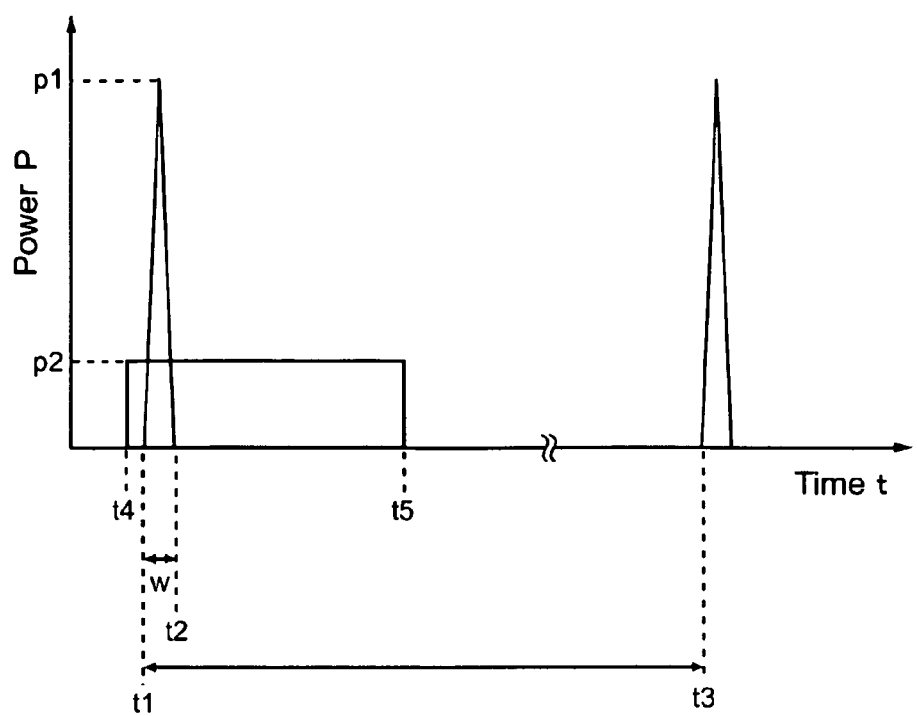
FIG. 6 is a diagram showing a relationship between powers of the ultrashort-pulse laser light and the CW laser light and time in a second modified example.

FIG. 6 is a diagram showing a relationship between powers of the ultrashort-pulse laser light and the CW laser light and time in a second modified example.

The second modified example is different from the above embodiment in the irradiation timing at which the mode-locked laser 2 irradiates the recording medium 10 with the ultrashort-pulse laser light and the irradiation timing at which the CW laser 5 irradiates the recording medium 10 with the CW laser light.

As shown in FIG. 6, the controller S controls the timings so that the CW laser 5 starts to irradiate the recording medium 10 with the CW laser light before time t1 at which the mode-locked laser 2 starts to irradiate the recording medium 10 with the ultrashort-pulse laser light (t4<t1).

With this structure, the recording medium 10 is irradiated in advance with the CW laser light during a time period between t4 and t1, and then the recording medium 10 is irradiated with the ultrashort-pulse laser light, which can form the recording mark G.

Figure 7:
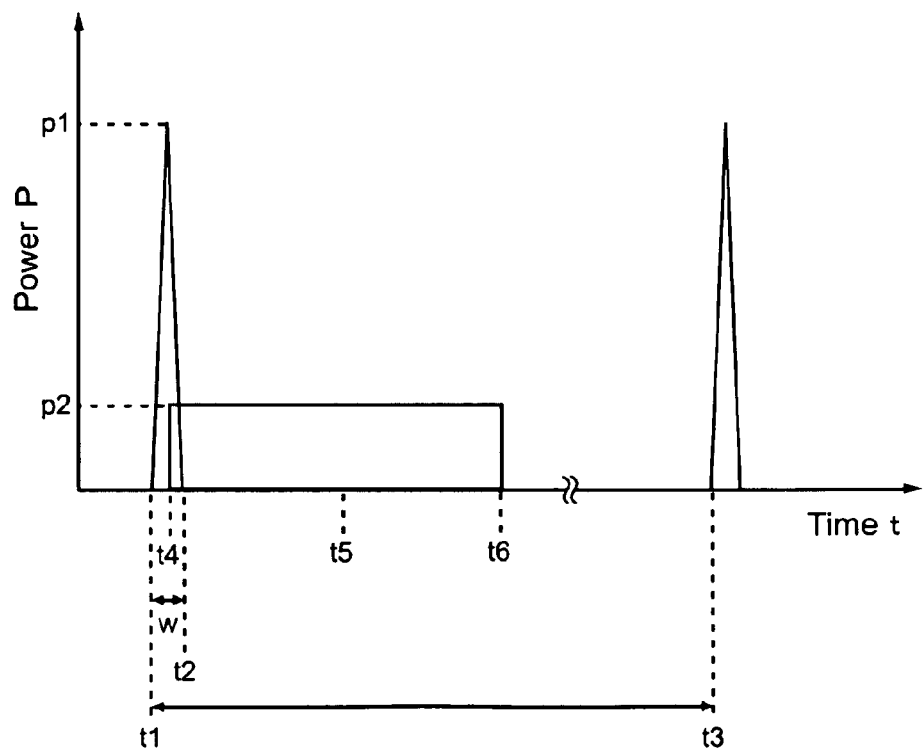
FIG. 7 is a diagram showing a relationship between powers of the ultrashort-pulse laser light and the CW laser light and time in a third modified example.

FIG. 7 is a diagram showing a relationship between powers of the ultrashort-pulse laser light and the CW laser light and time in a third modified example.

The third modified example is different from the above embodiment in the irradiation time period (t6−t4) of the CW laser light.

As shown in FIG. 7, the irradiation with the CW laser light is ended at a time t6, which is after the time t5 at which the irradiation with the CW laser light is ended in the above embodiment (t6>t5). That is, the irradiation time period (t6−t4) of the CW laser light is longer than the irradiation time period (t5−t4) of the CW laser light in the above embodiment.

Figure 8:
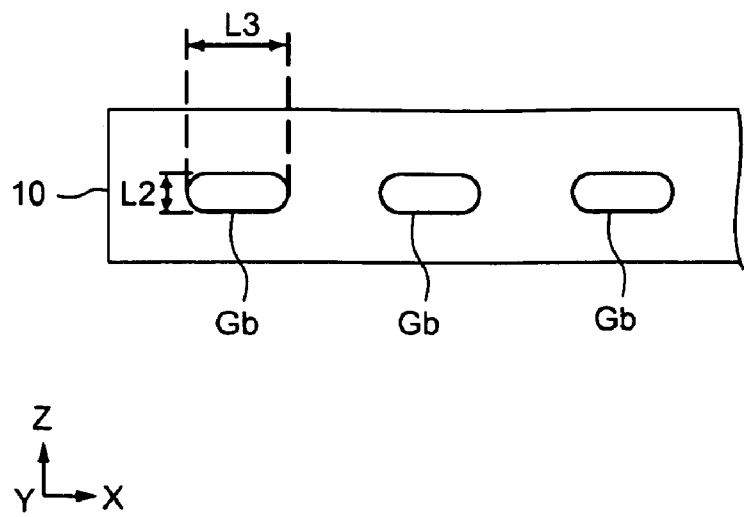
FIG. 8 is a cross-sectional diagram showing a recording medium in which recording marks are formed by irradiation with the CW laser light in the third modified example.

FIG. 8 is a cross-sectional diagram showing a recording medium in which recording marks are formed by irradiation with the CW laser light in the third modified example.

As shown in FIG. 8, a recording mark Gb formed in the third modified example has a length L3 in the in-plane direction X on the recording surface of the recording medium 10 longer than the length L1 of the recording mark G in the in-plane direction X on the recording surface formed in the above embodiment.

As described above, according to the third modified example, the irradiation time period (t6−t4) (see, FIG. 7) with the CW laser light emitted from the CW laser 5 is appropriately controlled by the controller S, with the result that the recording mark Gb can be easily controlled to be formed into an appropriate shape.

Further, for example, even in a case where the recording mark is formed using a material having poorer optical reactivity than the recording medium 10 and the like, the total amount of energy supplied to the material can be easily increased, and therefore the reaction can be positively and easily caused.

Figure 9:
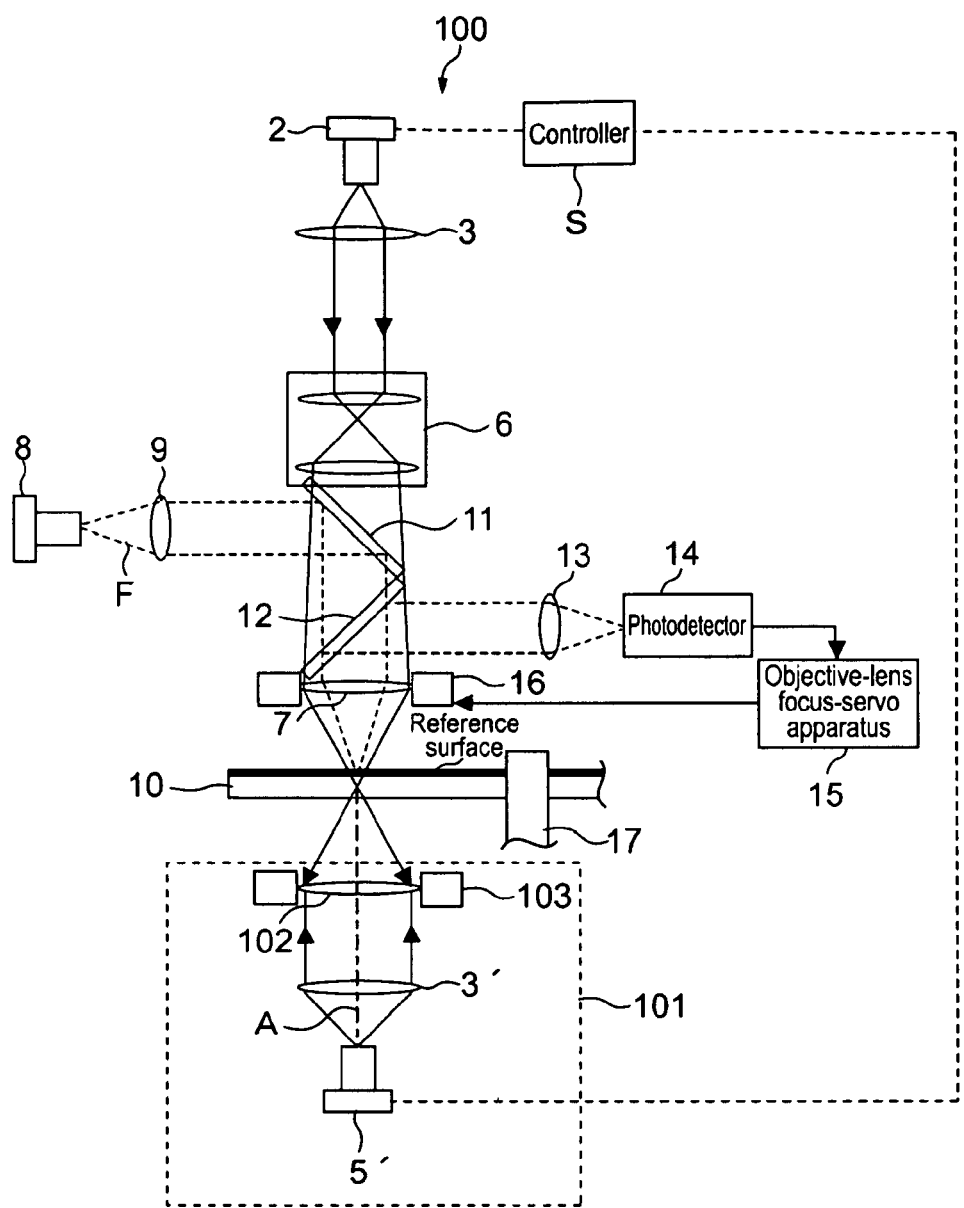
FIG. 9 is a diagram showing a structure of an optical system of an optical recording apparatus in a fourth modified example.

FIG. 9 is a diagram showing a structure of an optical system of an optical recording apparatus in a fourth modified example.

An optical system of an optical recording apparatus 100 in the fourth modified example is different from the optical system of the optical recording apparatus 1 according to the above embodiment in that the ultrashort-pulse laser light and the CW laser light are caused to enter the recording medium 10 in the opposite directions on the same axis A. The axis A is a common principal axis of a series of optical devices constituting the optical system, for example.

As shown in FIG. 9, the optical system of the optical recording apparatus 100 in the fourth modified example includes an optical system 101 including a CW laser 5'. The optical system 101 includes the CW laser 5', the lens 3', an objective lens 102, an objective-lens actuator 103, and the like.

The CW laser 5' emits, toward the lens 3', CW laser light whose power is 100 mW and whose irradiation time period is approximately 30 nsec.

The lens 3' causes the CW laser light emitted from the CW laser 5' to be parallel light and to enter the objective lens 102.

The objective lens 102 focuses the CW laser light that has entered from the lens 3' on an area where a recording mark is to be formed.

As a result, as in the above embodiment, the ultrashort-pulse laser light that enters the area where the recording mark is to be formed on the recording medium 10 in a direction parallel to the axis A and the CW laser light that enters the same area in a direction that is parallel to the axis A but opposite to the direction of the ultrashort-pulse laser light are spatially and temporally overlapped with each other, thereby forming the recording mark (void).

With this structure, from one side (upper side in FIG. 9) of the recording medium 10, the ultrashort-pulse laser light is caused to enter the area where the recording mark is to be formed on the recording medium 10 by the objective lens 7 and the like, and from the other side (lower side in FIG. 9) thereof, the CW laser light is caused to enter the area where the recording mark is to be formed on the recording medium 10 by the objective lens 102 and the like. As a result, the recording mark can be formed as in the above embodiment.

Figure 10:
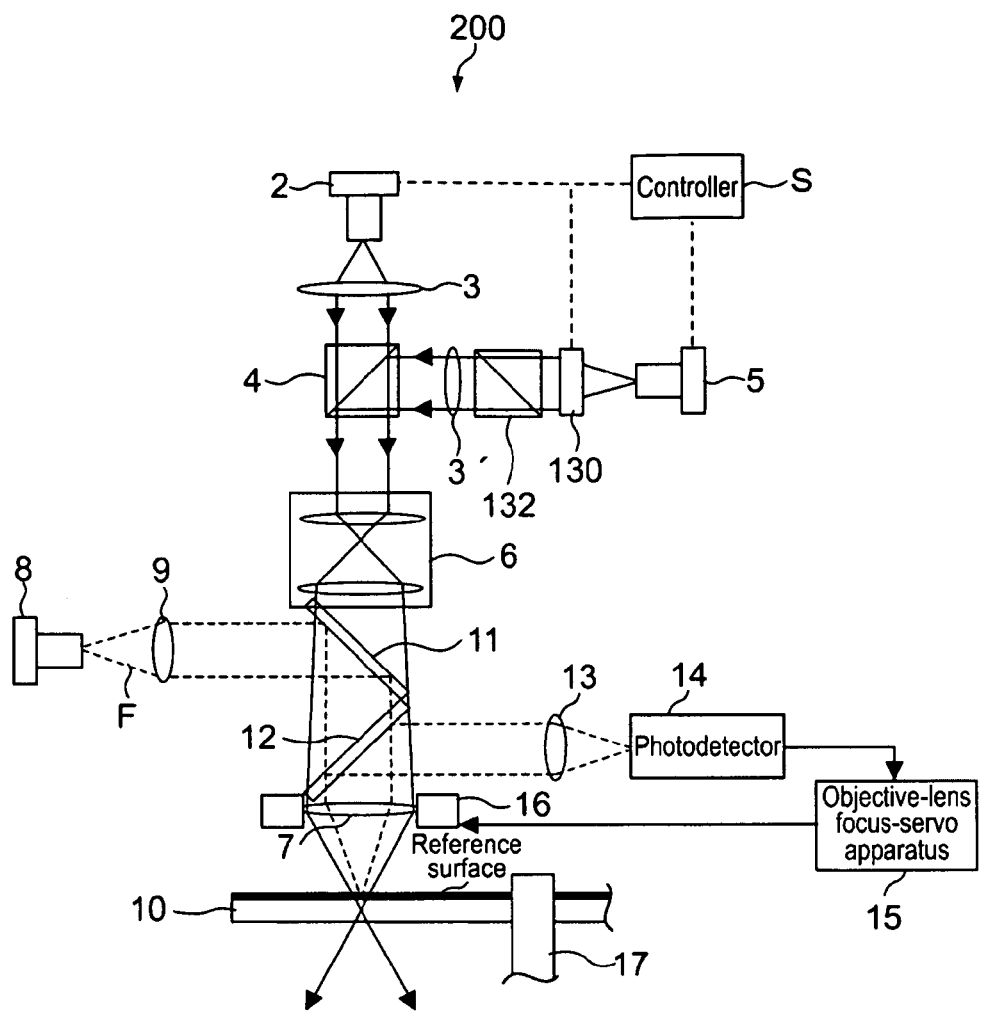
FIG. 10 is a diagram showing a structure of an optical system of an optical recording apparatus in a fifth modified example.

FIG. 10 is a diagram showing a structure of an optical system of an optical recording apparatus in a fifth modified example.

An optical system of an optical recording apparatus 200 in the fifth modified example is different from the optical system of the optical recording apparatus 1 according to the above embodiment in that an electrooptical modulator 130 for modulating an intensity of CW laser light is provided as shown in FIG. 10.

As shown in FIG. 10, the optical system of the optical recording apparatus 200 includes the electrooptical modulator 130 and a polarizer (polarization beam splitter) 132 between the CW laser 5 and the lens 3'.

The controller S outputs to the electrooptical modulator 130 a control signal for controlling an amplitude of the CW laser light that has entered the electrooptical modulator 130 from the CW laser 5.

Figure 11:
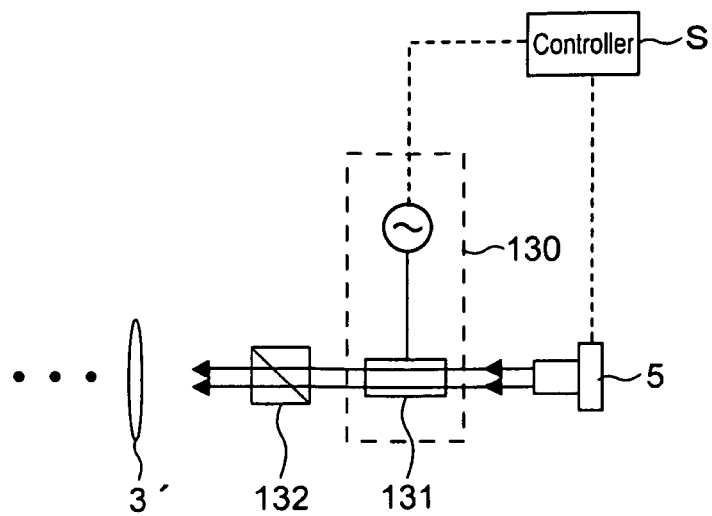
FIG. 11 is a diagram showing a structure of an electrooptical modulator.
Figure 12:
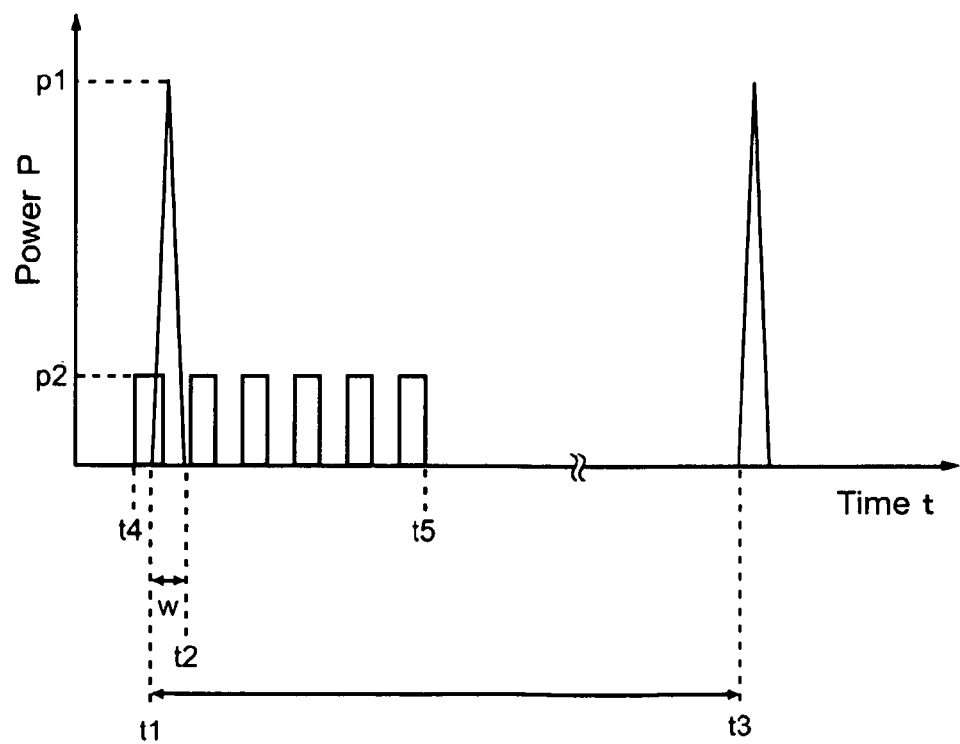
FIG. 12 is a diagram showing a waveform of CW laser light modulated.

FIG. 11 is a diagram showing a structure of the electrooptical modulator 130, and FIG. 12 is a diagram showing a waveform of the CW laser light modulated.

As shown in FIG. 11, the electrooptical modulator 130 is structured so that a voltage can be applied to a nonlinear optical crystal (e.g., potassium (kalium) dihydrogen phosphate (KDP) crystal) 131 at predetermined time intervals based on the control signal from the controller S, for example. With this structure, the voltage is applied to the nonlinear optical crystal 131 at the predetermined time intervals, with the result that the polarization state of the CW laser light continuously output from the CW laser 5 can be controlled and the intensity of the light passing through the nonlinear optical crystal 131 can be modulated as shown in FIG. 12, for example. The polarizer (polarization beam splitter) 132 outputs only a specific polarization component that has passed through the nonlinear optical crystal 131.

With this structure, before the irradiation of the recording medium 10 with the CW laser light, the electrooptical modulator 130 modulates the intensity of the CW laser light as shown in FIG. 12, and the recording medium 10 can thus be irradiated with the modulated CW laser light. As a result, the amount of energy of the CW laser light supplied to the recording medium 10 can be controlled and a temperature of the recording medium 10 can be controlled so as not to overheat the recording medium 10, for example.

In this example, the intensity of the CW laser light is modulated. Alternatively, a frequency (time) of the CW laser light may be modulated using the electrooptical modulator 130 having the sane structure. Also in this case, the temperature of the recording medium 10 can be controlled so as not to overheat the recording medium 10, for example.

It should be noted that the present invention is not limited to the embodiment and examples described above, and can be variously modified without departing from the technical idea of the present invention.

In the modified example described above, the electro-optical modulator 130 is used for modulating the CW laser light emitted from the CW laser 5.

Alternatively, instead of the electrooptical modulator 130, an acoustooptical modulator or the like may be used, for example.

Figure 13:
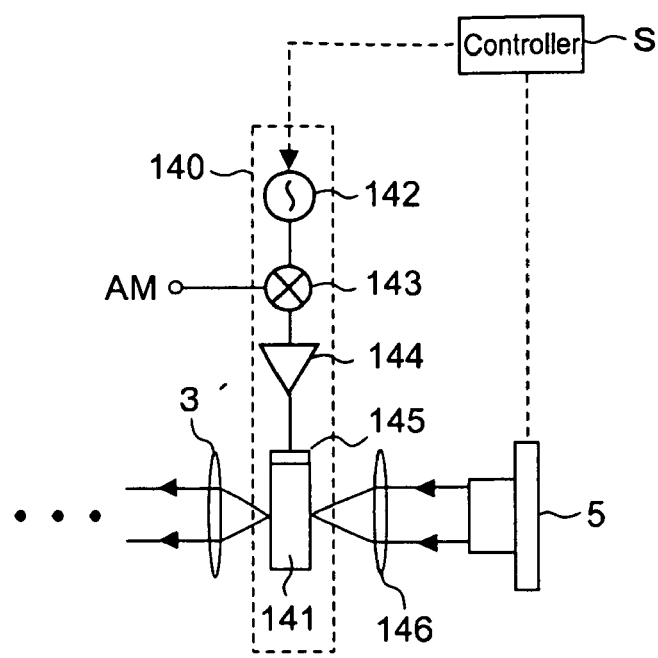
FIG. 13 is a diagram showing an optical system of an optical recording apparatus using an acoustooptical modulator.

FIG. 13 is a diagram showing an optical system of an optical recording apparatus using an acoustooptical modulator.

As shown in FIG. 13, an acoustooptical modulator 140 and a lens 146 are provided between the CW laser 5 and the lens 3' instead of the electrooptical modulator 130 and the polarizer 132 shown in FIG. 11.

The acoustooptical modulator 140 includes an acoustooptical material 141 such as gallium phosphide and quartz crystal, an oscillator 142, a mixer 143, an amplifier 144, and a piezoelectric element 145. The acoustooptical material 141 is disposed at a position where the CW laser light from the CW laser 5 enters. The mixer 143 performs AM modulation on a signal from the oscillator 142. The amplifier 144 amplifies the signal from the mixer 143. The piezoelectric element 145 is driven based on the signal thus amplified. The lens 146 is disposed between the CW laser 5 and the acoustooptical material 141. When the piezoelectric element 145 is driven, an acoustic wave can be input to the acoustooptical material 141. Based on an intensity of the acoustic wave input to the acoustooptical material 141, an intensity of light (diffraction light) that passes through the acoustooptical material 141 can be modulated. The lens 146 focuses the CW laser light from the CW laser 5 on the acoustooptical material 141.

With this structure, it is possible to modulate the CW laser light, control the amount of energy of the CW laser light, and irradiate the recording medium therewith as in the case shown in FIG. 11.

In the above embodiment, the ultrashort-pulse laser light has the power P of, for example, 1 kW as described with reference to FIG. 2. Alternatively, the value of the power P is not limited to this and may be further increased, and a pulse width w may be reduced.

In the above embodiment and modified examples, the recording medium 10 is irradiated with the ultrashort-pulse laser light and the CW laser light in the same direction parallel to the same axis A as shown in FIG. 1, or the recording medium 10 is irradiated with the ultrashort-pulse laser light and the CW laser light in the opposite directions parallel to the axis A as shown in FIG. 9. However, the directions in which the recording medium 10 is irradiated with the ultrashort-pulse laser light and the CW laser light may be differed from those of the above cases as long as the two laser light beams are focused on the same area where the predetermined recording mark is to be formed. For example, the laser light beams in all directions may be focused to form the recording mark.

Figure 14:
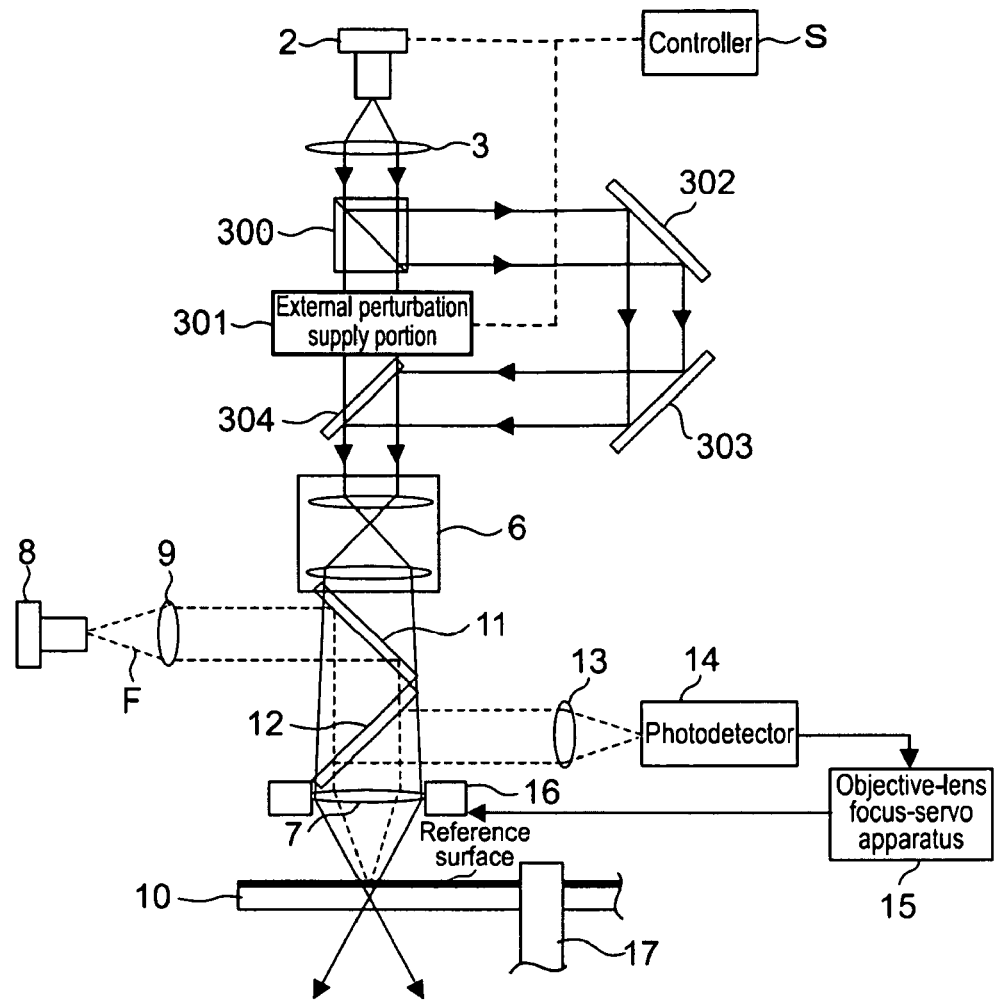
FIG. 14 is a diagram showing an optical system of an optical recording apparatus in a sixth modified example.

FIG. 14 is a diagram showing an optical system of an optical recording apparatus in a sixth modified example.

As shown in FIG. 11, the sixth modified example is different from the above embodiment in that a beam splitter 300, an external perturbation supply portion 301, and the like are provided.

As shown in FIG. 14, the ultrashort-pulse laser light emitted from the mode-locked laser 2 enters the beam splitter 300 via the lens 3. The ultrashort-pulse laser light that has entered the beam splitter 300 is split into light in a direction toward the external perturbation supply portion 301 and light in a direction toward a mirror 302 by the beam splitter 300. One of the ultrashort-pulse laser light beams split by the beam splitter 300 is subjected to external perturbation and the like due to, for example, light, an electric field, and a magnetic field by the external perturbation supply portion 301, thereby intentionally releasing the mode-locked state to generate the CW laser light. The controller S outputs to the external perturbation supply portion 301 a control signal for controlling, e.g., light, an electric field, and a magnetic field of the external perturbation supply portion 301. The CW laser light that has passed through the external perturbation supply portion 301 is focused on the recording medium 10 by the objective lens 7. On the other hand, the other of the ultrashort-pulse laser light beams split by the beam splitter 300 is reflected by the mirror 302, a mirror 303, and a mirror 304, and focused on the recording medium 10 by the objective lens 7.

With this structure, it is also possible to easily control the irradiation timings of the ultrashort-pulse laser light and the CW laser light by the controller S as described above (see, FIG. 2) and irradiate the recording medium 10 with the ultrashort-pulse laser light and the CW laser light in the temporally overlapping manner.

It should be noted that, with a semiconductor laser capable of oscillating short-pulse laser light, a gain region of the semiconductor laser may be irradiated with a short pulse to cause overshoot, thereby obtaining the ultrashort-pulse laser light.

What is claimed is:

1. An optical recording method for forming a recording mark, comprising:
   simultaneously irradiating an area of a medium with ultrashort-pulse laser light and continuous-wave laser light;
   ending the irradiation with the ultrashort-pulse laser light; and
   continuing the irradiation of the area with the continuous-wave laser light after the irradiation with the ultrashort-pulse laser light has ended.

2. The optical recording method according to claim 1, wherein the ultrashort-pulse laser light is a pulse of a pulse train of laser light.

3. The optical recording method according to claim 1, wherein the irradiation with the continuous-wave laser light is started after the irradiation with the ultrashort-pulse laser light is started.

4. The optical recording method according to claim 1, wherein the irradiation with the continuous-wave laser light is started at the same time as the irradiation with the ultrashort-pulse laser light is started.

5. The optical recording method according to claim 1, wherein the irradiation with the continuous-wave laser light is started before the irradiation with the ultrashort-pulse laser light is started.

6. The optical recording method according to claim 1, wherein an intensity of the continuous-wave laser light is modulated before the irradiation with the continuous-wave laser light is performed.

7. The optical recording method according to claim 1, wherein a frequency of the continuous-wave laser light is modulated before the irradiation with the continuous-wave laser light is performed.

8. The optical recording method according to claim 1, wherein the ultrashort-pulse laser light and the continuous-wave laser light are caused to enter the medium in the same direction on the same axis.

9. The optical recording method according to claim 1, wherein the ultrashort-pulse laser light and the continuous-wave laser light are caused to enter the medium in opposite directions on the same axis.

10. The optical recording method according to claim 1, wherein the ultrashort-pulse laser light has a pulse width of a femtosecond or more and 100 picoseconds or less.

11. The optical recording method according to claim 1, wherein the ultrashort-pulse laser light has a pulse power of 1 kW or less.

12. An optical recording apparatus for forming a recording mark, comprising:
    a first laser light source to irradiate an area of a medium with ultrashort-pulse laser light;
    a second laser light source to irradiate the area with continuous-wave laser light; and
    a controller to control irradiation time periods so that the irradiation with the ultrashort-pulse laser light and the irradiation with the continuous-wave laser light are performed simultaneously, and so that irradiation with the continuous-wave laser light ends after irradiation with the ultrashort-pulse laser light ends.

13. The optical recording apparatus according to claim 12, wherein the ultrashort-pulse laser light is a pulse of a pulse train of laser light.

14. The optical recording apparatus according to claim 12, wherein the controller controls the timings of the irradiation with the ultrashort-pulse laser light and the irradiation with the continuous-wave laser light so that the irradiation with the continuous-wave laser light is started after the irradiation with the ultrashort-pulse laser light is started.

15. The optical recording apparatus according to claim 12, wherein the controller controls the timings of the irradiation with the ultrashort-pulse laser light and the irradiation with the continuous-wave laser light so that the irradiation with the continuous-wave laser light is started at the same time as the irradiation with the ultrashort-pulse laser light is started.

16. The optical recording apparatus according to claim 12, wherein the controller controls the timings of the irradiation with the ultrashort-pulse laser light and the irradiation with the continuous-wave laser light so that the irradiation with the continuous-wave laser light is started before the irradiation with the ultrashort-pulse laser light is started.

17. The optical recording method according to claim 1, wherein the continuous-wave laser light is output from a different laser than the ultrashort-pulse laser light.

18. The optical recording apparatus according to claim 12, wherein the first laser light source is different from the second laser light source.

* * * * *